May 27, 1924.
B. C. BALL
COMBINED FLOWMETER AND PRIMER
Filed Aug. 2, 1921
1,495,315
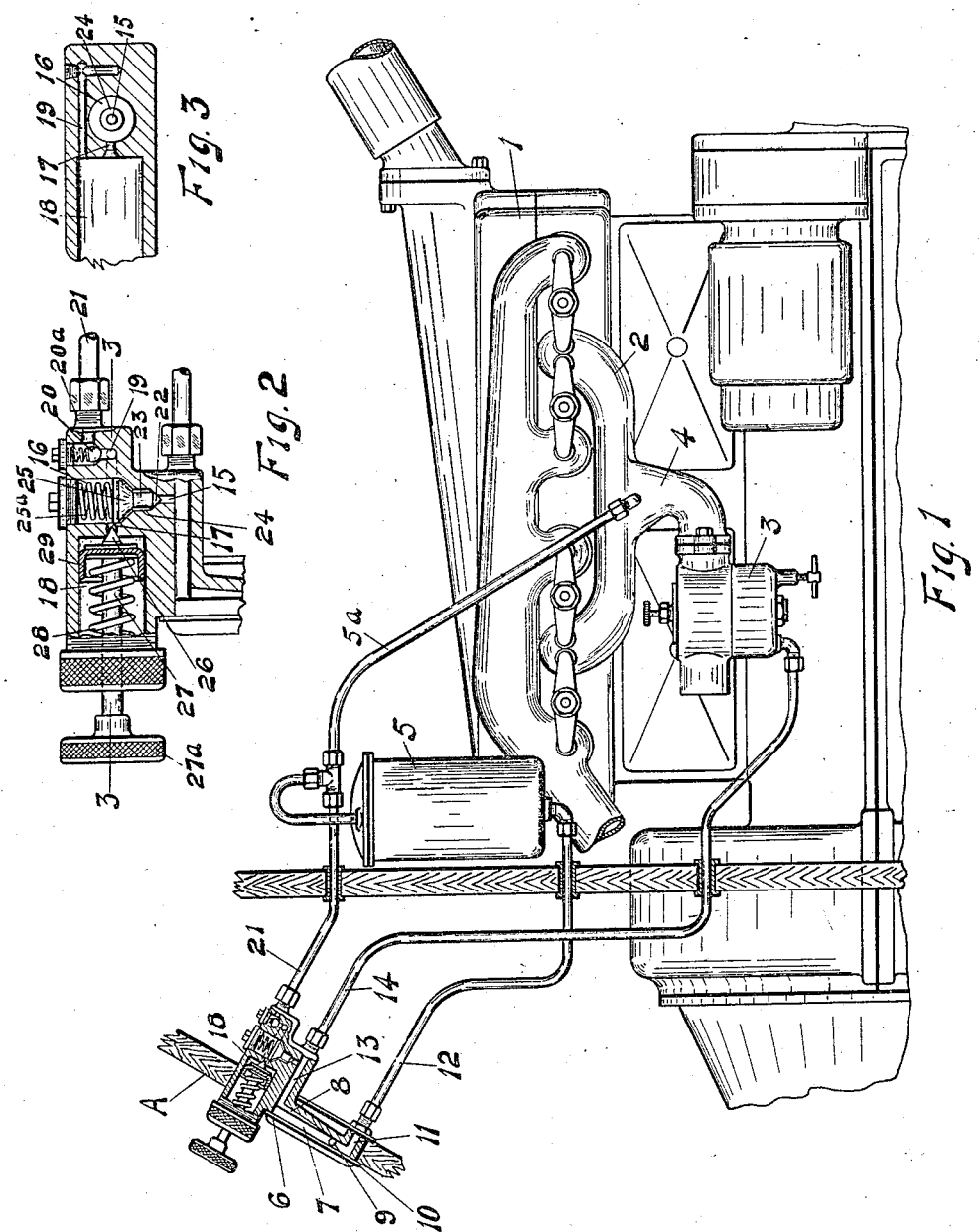
Bert C. Ball — INVENTOR.
BY
— ATTORNEY.

Patented May 27, 1924.

1,495,315

UNITED STATES PATENT OFFICE.

BERT C. BALL, OF PORTLAND, OREGON.

COMBINED FLOWMETER AND PRIMER.

Application filed August 2, 1921. Serial No. 489,275.

*To all whom it may concern:*

Be it known that I, BERT C. BALL, a citizen of the United States, residing at Portland, in the county of Multnomah and State of Oregon, have invented new and useful Improvements in Combined Flowmeters and Primers, of which the following is a specification.

This invention is designed to start a flow of fuel through a flowmeter when the flowmeter is above the source of supply and the piping forms a siphon drawing the fuel through the flowmeter. The device may also act as a primer for the engine of an automobile.

The invention is illustrated in the accompanying drawings as follows:—

Fig. 1 shows an elevation of an engine with the flowmeter and siphon establishing device in section.

Fig. 2 is an enlarged section of the siphon starting pump and primer.

Fig. 3 is a section on the line 3—3 in Fig. 2.

1 marks an engine, 2 its manifold, 3 a carburetor, 4 an intake between the carburetor and manifold, 5 a vacuum tank forming a source of fuel supply, 5ª the usual connection between the vacuum tank and the manifold, 6 a flowmeter comprising the passage 7, tapering groove 8, indicating element 9, 10 a transparent cover for the passage 7, 11 an inlet to the passage 7, 12 a pipe leading to the vacuum tank, 13 an outlet from the passage 7 and 14 a pipe leading from the outlet to the carburetor. The flowmeter is mounted on the dash A. In most automobiles the flowmeter to be at a convenient point for reading is above the source of supply as shown. When the connections become empty it is necessary to re-establish the siphon to carry the fuel from the vacuum tank to the carburetor. I have provided the following mechanism:—

A passage 15 leads from the outlet 13. This passage leads to a valve chamber 16. A passage 17 connects the valve chamber 16 with a pump chamber 18. A passage 19 leads from the pump chamber past a check valve 20 and connection 20ª to a pipe 21. The pipe 21 leads to the manifold preferably by way of the pipe 5ª. A check valve 22 controls the passage 15. It has a stem 23 operating in a guide-way 24. An enlarged plunger head 25 is formed on the stem 23 and forms a sliding fit with the walls of the chamber 16. A valve 26 controls the passage 17. The valve 26 has a stem 27 extending to without the pump chamber and the stem is provided with a handle 27ª at its outer end. A spring 28 closes the valve 26 when released.

When the valve 26 is opened the chamber 16 is subjected to the reduced pressure of the manifold and this results in the lifting of the head 25 and valve 22 so that there is a direct suction from the manifold on the outlet passage 13. This induces a flow of fuel through the flowmeter and draws the air from the piping resulting in the filling of the pipe 14 and then a flow of fuel to the manifold thus priming the engine. As the valve 26 is closed the connection to the manifold is closed and the valve 22 also closes thus supplementing the valve 26 in preventing any leak to the siphon.

When the engine is not running and it is desirable to fill the system this is accomplished by operating a pump plunger 29 carried by the stem 27. When this is pulled out the check valve 20 prevents a back-flow through the pipe 21 and the head 25 is lifted in the chamber 16 lifting the valve 22 permitting an indrawing of air or fuel to the pump chamber. On the inward stroke of the plunger 29 the valve 22 is closed and the air or fuel forced through the passage 19 past the check valve 20. The result of the priming action is to first exhaust the air from the flowmeter and piping filling these with fuel so as to establish the siphon and if the pumping is continued fuel is forced through the pipe 21 and pipe 5ª to the manifold.

It is desirable to make the area of the valve 22 very small. The head 25 is provided with a larger area so as to assure responses to reduced pressure in the valve chamber. A spring 25ª may be provided for seating the valve 22 and a spring may also be provided for the check valve 20 if desired.

What I claim as new is:—

1. In a flowmeter and primer for automobiles, the combination of a metering tube in a siphon loop; an indicator in the tube; a pump connected with the metering tube, the pump having a plunger and a discharge bypass; and a valve actuated with the plunger controlling a connection between the metering tube and the bypass.

2. In a flowmeter and primer for automobiles, the combination of a metering tube in a siphon loop; an indicator in the tube; and a pump connected with the metering tube, the pump having a plunger, a bypass, and an inlet valve having a restricted closing surface and an enlarged head subjected to the pumping action.

3. In a flowmeter and primer for automobiles, the combination of a metering tube in a siphon loop; an indicator in the tube; a pump connected with the metering tube, the pump having a plunger, a bypass, and inlet valve having a restricted closing surface and an enlarged head subjected to the pumping action; and a valve actuated with the plunger controlling an outgoing connection between the metering tube and the bypass.

4. In a flowmeter and primer for automobiles, the combination of an intake manifold; a vacuum tank; a metering tube at a level above the vacuum tank; a pump connected with the metering tube; a carburetor connected with the metering tube; a connection between the metering tube and the vacuum tank; a bypass connection between the intake manifold and the pump; and a valve actuated with the pump controlling an outflowing connection between the metering tube and the bypass connection.

5. In a flowmeter and primer for automobiles, the combination of a metering tube in a siphon loop; a pump connected with the metering tube; an inlet valve for the pump; a chamber in which the inlet valve is arranged, said chamber having a restricted inlet valve seat; a valve in the chamber having a closing surface operating on the seat and a head subjected to the pumping action; a valve carried by the plunger and controlling a connection between the chamber and the discharge of the pump; and a check valve at the discharge side of the pump.

In testimony whereof I have hereunto set my hand.

BERT C. BALL.